Feb. 19, 1935. V. R. DESPARD 1,992,059
ELECTRIC WIRING APPARATUS
Filed April 20, 1934 2 Sheets-Sheet 1
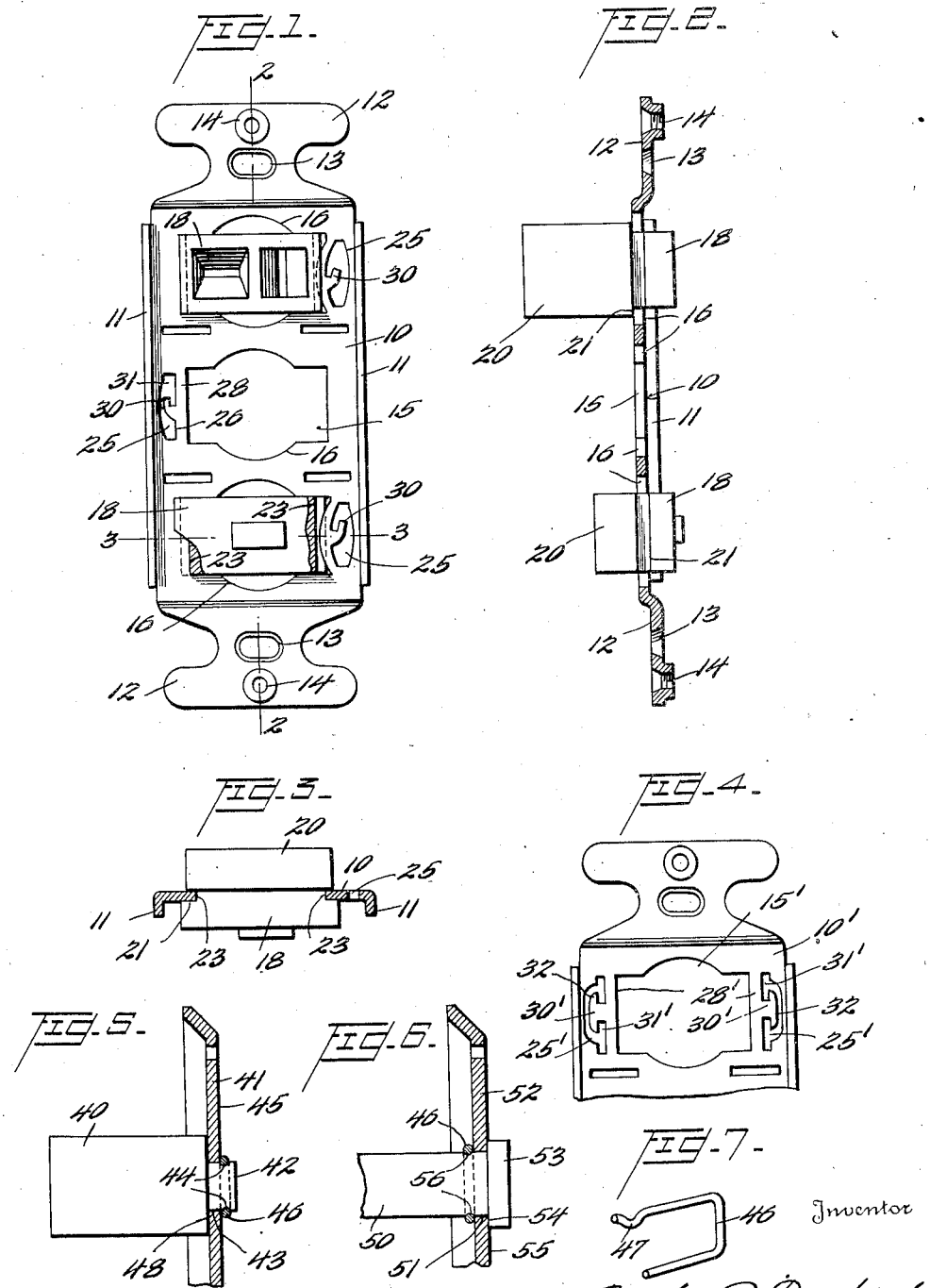

Feb. 19, 1935.  V. R. DESPARD  1,992,059
ELECTRIC WIRING APPARATUS
Filed April 20, 1934  2 Sheets-Sheet 2
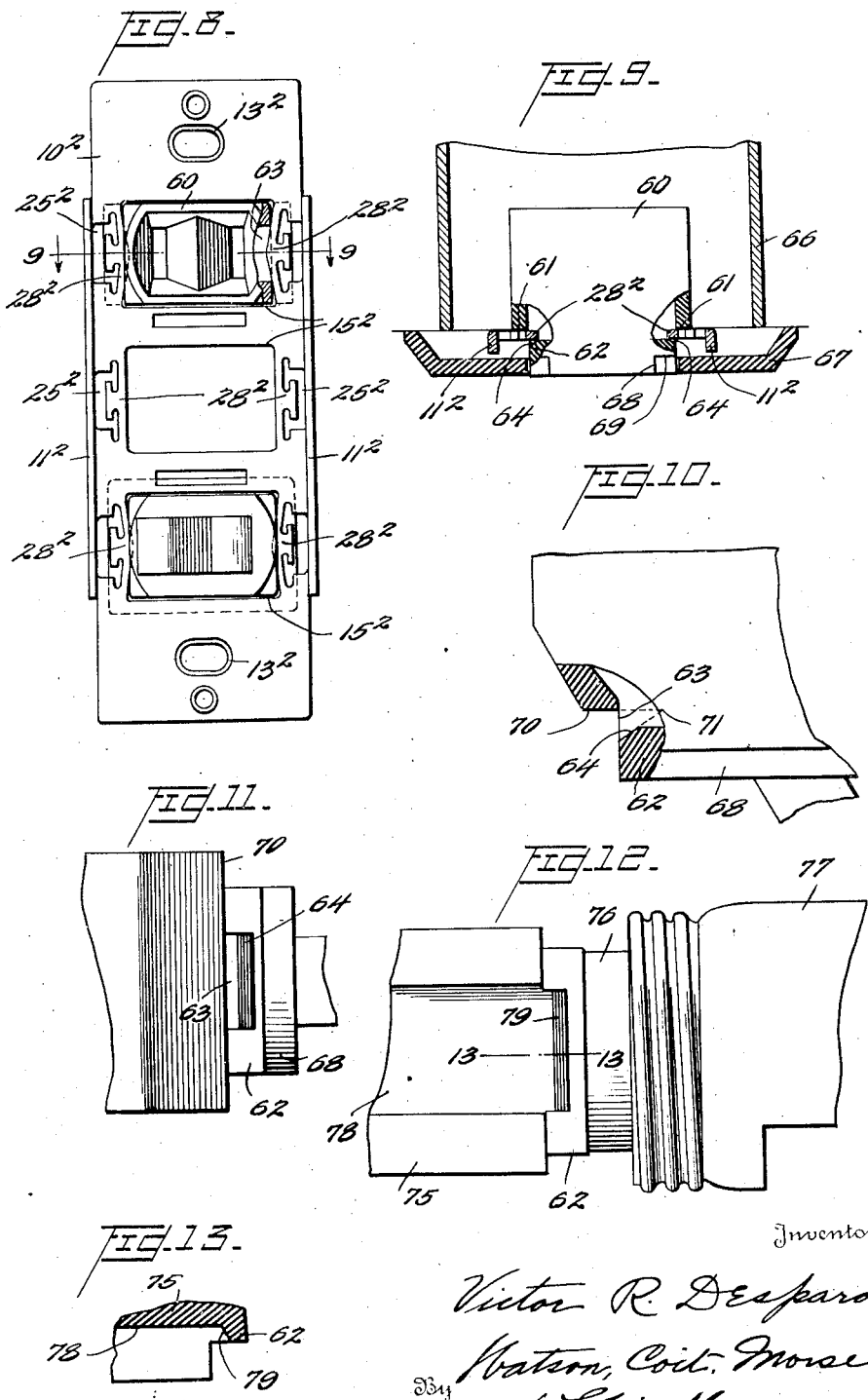

Patented Feb. 19, 1935

1,992,059

UNITED STATES PATENT OFFICE 1,992,059

ELECTRIC WIRING APPARATUS

Victor R. Despard, Syracuse, N. Y., assignor to Pass & Seymour, Inc., Syracuse, N. Y., a corporation of New York Application April 20, 1934, Serial No. 721,573

15 Claims. (Cl. 247—20)

This invention relates to electric wiring equipment and more particularly to such equipment of the flush wall-plate type as used in homes, office and other buildings mainly for controlling lights, attaching portable devices, indicating the condition of circuits and the like. This application is a continuation in part of my application Serial No. 580,411, filed December 11, 1931, for Electric wiring apparatus.

The invention relates especially to terminal apparatus for wiring systems, such as wall switches, convenience outlets, pilot lights, radio and telephone outlets, push buttons and the like.

An important object of the invention comprises improvements in the construction of these devices and in the supporting means therefor whereby their mounting in outlet boxes is facilitated.

One of the novel features of the invention comprises a mounting plate adapted to extend across the open face of an outlet box and provided with one or more openings each for the reception of a portion of a wiring device together with means for engaging this portion to secure it into the mounting plate.

Another important feature of the invention resides in the provision of a metal bridge or strap member for the support of one or more wiring devices of the interchangeable type wherein a portion of the bridge can be deformed to engage and hold a wiring device in position therein.

A still further feature of the invention resides in the provision of a metal mounting plate having an opening therein for the passage therethrough of a portion of a wiring device, together with a slot adjacent one of the sides of this opening to provide a laterally bendable strip for engagement with the portion of the wiring device extending through the opening to secure it in position and in which a hook is provided on the slot side of the strip for engagement by a tool to withdraw the strip in case it is desired to remove the wiring device from the bridge.

Another feature of the invention consists in the construction of the insulation portion of the various wiring devices to cooperate with the mounting strap and including the provision thereon of a shoulder to rest against the lower face of the strap, a neck projecting forwardly from the shoulder to extend through the opening in the strap and a wall in said neck substantially facing the shoulder and inclined toward it whereby a deformable strip on the mounting strap can be projected beneath the inclined wall to wedge the shoulder firmly against the strap.

Other and further objects and features of the invention will be more apparent to those skilled in the art upon a consideration of the accompanying drawings and following specification, wherein are disclosed several exemplary embodiments of the invention with the understanding that such changes and deviations may be effected therein as fall within the scope of the appended claims without departing from the spirit of the invention.

In said drawings:

Figure 1 is a face view of a mounting bridge having three openings, in two of which wiring devices are shown and in one of which the device is broken away sufficiently to show the connecting means between the bridge and the device;

Figure 2 is a central longitudinal section taken on line 2—2 of Fig. 1;

Figure 3 is a transverse section taken on line 3—3 of Fig. 1;

Figure 4 is a fragmentary view similar to Fig. 1 but showing a modified arrangement for securing wiring devices in position on a bridge plate;

Figure 5 is a fragment of a longitudinal central section of a modified arrangement;

Figure 6 is a view similar to Fig. 4, showing a still further modification;

Figure 7 is a perspective view of a fastening means adapted for use with the devices of Figs. 4 and 5;

Figure 8 is a view similar to Fig. 1 of a commercial form of the device showing a convenience outlet and a switch supported in the mounting strap;

Figure 9 is a section on the line 9—9 of Fig. 8 and in addition showing the assembly mounted in an outlet box and behind a wall plate;

Figure 10 is an enlarged fragmentary view of a portion of a switch housing with parts broken away to disclose the opening which receives the deformable portion of the mounting strap;

Figure 11 is an end elevation of a fragment of the switch housing showing this same opening;

Figure 12 is an end elevation of a fragment of a pilot light receptacle and hood showing the portion therein engaged by the deformable portion of the mounting strap; and Figure 13 is a section on line 13—13 of Fig. 12.

Electric wiring apparatus, and particularly such terminal devices as switches, convenience outlets, and the like, are usually arranged one to a gang and each is provided with individual means for mounting across the face of a single gang outlet box. However, where a plurality of wiring devices can be interchangeably mounted in a single gang box in accordance with my Reissue Patent 19,092, February 20, 1934, for Electric wiring apparatus, the individual and interchangeable wiring devices may be arranged to be mounted in multiple either on a bridge member which spans the open face of a single gang outlet box or directly upon the wall plate which closes the open face of the outlet box. In accordance with the present invention, novel means are provided for mounting these individual wiring devices upon their supporting plate, which may be either a bridge or the wall plate.

Referring particularly to Figs. 1, 2 and 3, a novel type of bridge or supporting member is disclosed provided with integral means for securing the wiring devices thereto with a minimum of effort.

The bridge member 10 is made from a metal plate to substantially the configuration disclosed in my above mentioned patent, and is formed of a relatively sturdy strip of metal with the upturned edges 11 for longitudinal reinforcement against bending, and having the plaster ears 12 to properly position it in respect to the surface of the wall. At the junction of the plaster ears and the main body of the plate are the elongated slots 13 for the passage of screws which engage in lugs on the ends of the outlet box to secure the bridge in position thereon. The openings 14 in the bosses in the plaster lugs are for the reception of screws which secure the wall plate over the bridge to effectually close the open face of the outlet box and provide a finish.

The bridge shown is for the reception of from one to three wiring devices, but it is obvious that a bridge can be provided with suitable apertures for any feasible number of wiring devices, either disposed parallel to each other as shown, or at different angles in respect to the axis of the bridge. The apertures for the reception of the various wiring devices are shown at 15, and each comprises the generally rectangular opening upon which is superposed a circular opening 16 of a diameter greater than the width of the rectangular opening and less than the length of the rectangular opening. The circular portion of the opening is for the reception of the end of the bulb of a pilot light, if such is used, as described in the above noted patent, and the rectangular portion of the opening is for the reception of the portion 18 of any one of the various interchangeable wiring devices 20.

These wiring devices, the mechanical features of which form no part of the present invention, are preferably molded from some suitable insulating material, such as a phenol condensation product, to a suitable size and shape to accommodate the necessary contacts or other essential parts of their makeup, but each has the forwardly projecting neck portion 18 of such a configuration as to pass through the rectangular opening 15 either from the front or the back of the bridge. This portion is formed in such a manner as to provide a shoulder 21 at the junction of the portion 18 and the body of the device, which shoulder may abut against one face of the bridge plate. In the case of certain small devices, as the push button shown at the bottom of Figs. 1 and 2, the reduced portion may be the main body and the enlarged portion providing the shoulder may be on the outer side of the bridge plate, but in the case of such large devices as switches, the neck surrounding the operating handle will usually pass through the aperture from the rear of the plate. In any case, there will be a wall plate with a suitable number of properly sized apertures to permit these extensions 18 to project through, preferably with their ends flush with the surface of the plate for the sake of appearance.

Three is the approved number of wiring devices for use in an outlet box having an opening of standard single gang area and while they may be used singly, in pairs or three's, in multiple or selectively and interchangeably with the other wiring devices different in purpose and body size, it is obvious that the height of the body (measured in the direction of greatest dimension of the box opening) cannot be greater than one-third of this dimension.

It is desired that the various wiring devices be rigidly secured in the openings in the bridge plate, and in accordance with one form of the present invention, for this purpose, each is provided on each of the shorter sides of the portion 18 with a shallow transverse groove 23 of a width equivalent to the thickness of the metal of the bridge plate and preferably of a length equal to that of the side in which it is located. When the wiring device has its portion 18 inserted through the bridge plate, it can then be moved laterally to position it as shown in the lower device of Fig. 1, with the groove 23 on the left receiving the edge of the plate adjacent the opening.

For securing the opposite end of the portion 18, the plate is provided, as shown at the middle opening, with a slot 25 slightly spaced from one end of the opening 15. This slot has a substantially straight side 26 adjacent the opening and an arcuate side remote therefrom to define a narrow strip 28 of metal attached only at its ends to the metal of the bridge and which is deformable laterally to the position shown at the top and bottom openings of Fig. 1 to be received into the groove 23 in the corresponding end of the portion 18 of the wiring device to thus firmly secure it in the opening. As shown, the slots 25 are alternated in their positions in respect to the ends of the three openings in the bridge. The narrow strip of metal 28 is readily deformed laterally, for instance, by the expedient of placing a screw driver in the slot 25 and partially rotating it to bend the metal.

In order that the metal of the strip 28 may be bent back to release a wiring device previously secured therein, when it is desired to change it or replace it, the straight side 26 of the slot wall is extended into a hook 30 which projects into the slot and partially defines the substantially rectangular portion 31 of the slot for the reception of a screw driver blade.

Viewing the center opening in the convenience outlet, it will be seen that to bend the strip 28 for securing a wiring device in the opening, a screw driver is placed in the slot portion 31 and rotated in a counterclockwise direction, whereby deforming the strip and moving its center into the opening 15 a sufficient distance to engage the slot 23 of a wiring device. For removing the device, the screw driver is rotated in a clockwise direction, thus withdrawing the strip and moving it toward the left.

With the construction above described, the attachment of the wiring devices to the bridge is effected in an extremely simple manner without the addition of any parts, and yet an effective and rigid attachment is provided which can be conveniently released when desired.

In order to reduce the total amount of lateral bending which must be imparted to the narrow srtip of metal adjacent the end of the opening which receives the wiring device, it may sometimes be desirable to provide a laterally bendable strip at each end of the opening whereby half of the bending can be imparted to each of the strips, thereby reducing the total for each strip. Such an arrangement is shown in the fragmentary view, Fig. 4. In this construction there are two bendable strips 28', one at either end of the opening 15' in the plate 10' which, it will be understood, is substantially identical with that shown in Figs. 1 to 3 and may contain any desired number of these openings.

In addition to having the two bendable strips 28' the configuration of the slots 25' has been changed to make them symmetrical with respect to the long axis of the opening 15'. Under these conditions they are provided at each end with a screw driver receiving portion 31' and the hook-like portion 30' is double, the hook ends 32 and 33 extending in opposite directions as clearly seen in the drawings.

By the construction just described, very accurate positioning of the wiring device in the bridge member can be effected and since there is less bending for each of the metal strips, the possibility of breakage; particularly if several changes are made, is greatly reduced. Where several of the devices are secured in a single bridge, adjustments can readily be made to align these for accurate cooperation with the openings in wall plates.

In the construction of Fig. 5, the arrangement is such that the wiring devices 40 may be secured directly to the wall plate 41 without the use of a bridge. Various constructions are possible to produce this result, and as an example the construction of Fig. 5 is shown. For this purpose, a reduced neck portion 42 is provided on each of the wiring devices which snugly passes through the opening 43, preferably rectangular, in the wall plate and extends a short distance beyond the front face thereof. Preferably at least two sides of this neck 42 are grooved, as at 44, closely adjacent the outer face 45 of the plate 41, and into these grooves is snapped a wire attaching device 46, as seen in Fig. 7, conveniently formed into a U-shape, and if desired, with an end 47 bent as shown, to insure against unintentional detachment. This wire 46 will engage to about half its diameter in the grooves 44 and will abut the outer face 45 of the wall plate so as to prevent movement of the wiring device rearwardly in the plate, movement in the opposite direction being prevented by the engagement of the shoulder 48 on the wiring device with the rear face of the plate.

It will be evident that various other forms of fastening means may be used, and it is to be considered that the above is only exemplary.

The construction of Fig. 6 differs from that of Fig. 5 only in that the body 50 of the wiring device is of a size to pass through the opening 51 in the wall plate 52, and there is an enlarged head 53 on the front of this device which forms the shoulder 54 abutting against the outer face 55 of the wall plate to prevent movement of the device rearwardly through the plate. A suitable groove 56 in at least two of the sides of the body 50 provides for the reception of the wire 46, as shown in Fig. 7 so that this device is held in the manner of Fig. 5 by the engagement of the shoulder with one face of the wall plate and of the locking wire with the opposite face. It will be obvious that instead of providing a head 53 which extends beyond the face of the plate 52, that the aperture through the plate could be tapered and a head of a corresponding shape provided to fit these tapered sides and with its outer end flush with the face of the plate. This may be desired for the sake of appearance.

Throughout the following claims the expression "wiring device" has reference only to such parts as switches, convenience and radio outlets, pilot lamps, push buttons, cord terminals, blanks and the like which form the terminal apparatus of the electric wiring circuits and specifically to such parts intended to be housed in outlet boxes and behind suitable cover plates.

In Figs. 8 and 9 is shown an actual commercial embodiment of the invention in which the mounting strap $10^2$ is not materially different from that shown in Fig. 4. It does, however, have a full rectangular form instead of being reduced in width adjacent the screw slots $13^2$. This then provides the plaster ear feature referred to previously. The slots $25^2$ are slightly different in configuration and their outer portions extend to the reinforcing ribs $11^2$ as clearly seen in Fig. 8. In this form of the device the openings $15^2$ for the necks of the wiring devices are truly rectangular, as seen in Fig. 8, with only slightly filleted corners.

The major changes in this embodiment are in the wiring devices. They each have a body portion of insulating material larger in cross section than the openings $15^2$, although in the case of certain of these items, notably the convenience or power outlet 60 seen at the upper portion of Fig. 8, the total height of the body is substantially the same as the minor dimension of the opening $15^2$. The length, however, is greater than the major dimension of the opening as clearly seen in Fig. 9 thus providing a shoulder 61, at each end of the body which abuts the rear face of the strap $10^2$ and locates the wiring device accurately in respect thereto with the assistance of the neck 62 which cooperate with the walls of the opening.

The neck and the shoulders by their cooperation with the strap prevent relative movement between the wiring device and the strap except in one direction and that is prevented by bending the portion $28^2$ at each end of the strap opening to engage the neck. In lieu of the full length slot as shown at 23 in Fig. 1 there is an opening or recess 63 in each end wall of the neck 62 which is of less length than the width of the neck as clearly seen at the right hand side of Fig. 8. It extends from the plane of the shoulder 61 a distance outwardly along the neck somewhat greater than the thickness of the mounting strap and its outermost wall 64 is inclined as clearly seen in Fig. 9, the plane of inclination, if extended, meeting the plane of the shoulder at a place within the body of the wiring device. This surface 64 is engaged by the portion $28^2$ which is bent or deformed from the strap $10^2$ and the considerable effort used in making this deformation, assisted by the wedge action is responsible for holding the shoulder 61 tightly against the rear face of the mounting plate and produces an extremely rigid connection between the wiring device and the mounting strap.

In Fig. 9 is shown the conventional outlet box 66 across the open face of which the mounting strap $10^2$ is applied and this open face is shown as closed by the wall plate 67 which is suitably apertured to pass the reduced ends 68 of the necks of the wiring devices. These ends are all of uniform size for interchangeable cooperation with the openings in the wall plate and there is a shoulder 69 at the junction of the reduced and main portions of the neck which serves to prevent the end of the neck from extending beyond the face of the plate 67.

Larger wiring devices, as for instance switches such as shown mounted in the lower opening of Fig. 8, have the shoulder 70 extending on all sides of the neck. Figs. 11 and 12 show, on an enlarged scale, a recess in the end of the neck of such devices as switches. It is substantially identical with that in the convenience outlet neck as seen in Fig. 9. These views clearly show the shoulder 70, the neck 62, the reduced extension 68 thereon and recess 63 with its inclined outer wall 64. It can be seen by the dotted lines how the plane of this wall extended meets the plane of the shoulder at 71 within the body of the switch. The recess 64 actually communicates with the hollow interior of the shell of the switch but this is only for the sake of convenience in moulding.

In certain types of wiring devices there is need for deep longitudinal grooves in the end walls to accommodate terminals and for the sake of reducing the quantity of insulating material in the body these may be extended to merge with the recesses for the reception of the bendable portions of the mounting strap. Referring to Figs. 12 and 13 there is seen a receptacle for a pilot lamp including the body portion 75 of insulating material, the neck 62 to be received in the mounting strap, and projection 76 which passes through the wall plate and extends up into and receives the lamp canopy or hood 77. The body portion of the receptacle has a deep fore and aft groove 78 in each end thereof which extends up to and partially into the neck where it meets the inclined wall 79 forming its upper boundary. This wall positioned exactly the same as the wall 64 in Figs. 9 and 10, is of the same length and performs the same function. In this form of device, however, the bendable portion of the mounting strap is not received in a small recess which extends only forwardly from the level of the shoulder but is rather received under an inclined wall which forms the forward end of an elongated recess or channel.

Other forms of wiring devices are usable with the same mounting strap and face plate and may have either of the types of recess to be engaged by the bendable portion thereof or may have other overhanging walls or parts to be thus engaged to secure the device firmly in the strap.

It will be appreciated that the essential feature of the invention resides in the mounting of the wiring device by a neck projecting through a plate and by engaging the neck by means movable substantially parallel to the plane of the plate to hold the device in position.

Having thus described the invention, what is claimed as new and desired to be secured by Letters Patent is:

1. In electric wiring apparatus, in combination, a bridge plate of metal adapted to be secured across the open face of an outlet box, said bridge having an opening therethrough, a wiring device of insulating material having a neck adapted to extend through said opening, said bridge having a portion thereof bendable to engage said neck to secure the device in the opening.

2. In electric wiring apparatus, in combination, a bridge plate of metal adapted to be secured across the open face of an outlet box, said bridge having an opening therethrough, a narrow strip of metal adjacent said opening defined by the opening and a slot, a wiring device having a portion adapted to extend through said opening, and a recess in one side of said portion to receive said strip of metal when bent laterally.

3. In electric wiring apparatus, in combination, a bridge plate of metal adapted to be secured across the open face of an outlet box, said bridge having an opening therethrough, a narrow strip of metal adjacent said opening defined by the opening and a slot, a wiring device having a portion adapted to extend through said opening, said portion having grooves in two sides thereof, one of said grooves being adapted to engage over one edge of the opening and the other being adapted to receive the metal strip when it is bent laterally.

4. In electric wiring apparatus, in combination, a bridge plate adapted to be secured across the open face of an outlet box, said bridge having an opening therethrough, a wiring device having a neck adapted to extend through said opening, one of the parts of said apparatus having a portion deformable to engage the other to hold the parts tightly together.

5. In electric wiring apparatus including switches and convenience outlets of the flush wall plate type, in combination, a plate adapted to be secured against the open face of a wall mounting outlet box, said plate having an elongated opening therethrough, a wiring device having a major functioning portion adapted to fit into the outlet box and having a forwardly extending neck adapted to project out of the box through said opening, and means integral with one of said parts deformable to engage the other and secure them together against relative movement in any direction.

6. A bridge member for wiring devices comprising, a metal plate having a large opening therethrough, a slot through said plate adjacent said opening and defining therewith an interposed, narrow, metal strip bendable laterally to reduce the size of said opening.

7. A bridge member for wiring devices comprising, a metal plate having at least one substantially rectangular opening therethrough, a slot in said plate adjacent each of two sides of said opening and defining therewith two narrow metal strips bendable laterally toward each other to reduce the size of said opening.

8. A supporting bridge member for interchangeable, individual wiring device comprising, in combination, a metal plate to span the open face of an outlet box, said plate having an opening to receive a wiring device, a slot adjacent one side of said opening and defining a narrow bendable strip of metal joined at its ends to the plate, means extending from the strip into the slot and defining with a portion of the slot walls an opening for a tool to bend or straighten the strip while retaining it substantially in the plane of the metal plate.

9. A bridge member for wiring devices comprising, a metal plate having an opening therethrough to receive a portion of a wiring device, a slot in said plate adjacent an edge of said opening to define with the opening a narrow strip bendable toward the opening to reduce the size thereof and means secured to said strip to be engaged by a tool to retract the strip.

10. A bridge member for wiring devices comprising, a metal plate having a large opening therethrough, a slot through said plate adjacent said opening and defining therewith an interposed, narrow, metal strip bendable laterally to reduce the size of said opening and a hook integral with said strip and extending into the slot to receive a tool for withdrawing the strip from the opening.

11. A supporting bridge member for interchangeable, individual wiring devices comprising, in combination, a metal plate to span the open face of an outlet box, said plate having at least one opening to receive a wiring device, each of two opposite sides of said opening having a slot adjacent thereto and defining therewith a narrow, bendable strip of metal joined at its ends to the plate, a double ended hook formed integral with each of said strips and extending into the slot.

12. A bridge member for wiring devices comprising, a metal plate having at least one substantially rectangular opening therethrough, a slot in said plate adjacent each of two sides of said opening and defining therewith two narrow metal strips bendable laterally toward each other to reduce the size of said opening and means on each of said strips for engagement by a tool to retract the strip after bending.

13. A wiring device for use interchangeably in a mounting strap having an opening therein, including in combination, a shell of insulating material, a forward face thereon, a neck projecting from said face and adapted to extend through said opening, a portion substantially in the plane of the shell face being adapted to abut the rear face of said strap as a shoulder, and means on said neck for direct cooperation with a portion of said strap to fasten the device in the strap and clamp the shoulder thereagainst.

14. An electric wiring device for use interchangeably with wiring devices different in body size, in an outlet box having an opening of standard single-gang height, said device including, a body of insulating material of a height not greater than one-third of the height of said opening; a neck of less than body cross section projecing forwardly from the main body portion and providing a shoulder adjacent the junction; a pair of inclined surfaces facing said shoulder and oppositely disposed in the neck, said surfaces having their planes converging to meet the plane of the shoulder within the neck.

15. A wiring device for use interchangeably in single or plural number in an outlet box having an opening of standard single gang height, including a shell of insulating material having, in combination, a body dimensioned for inclusion of a plurality thereof one above another within the face opening of a single gang outlet box, and a forwardly projecting neck of less than body cross-section, said neck being insertable from rear to front through any opening of an integral supporting strap having one or more openings therein each receptive of an individual wiring device and each partly bordered by a deformable portion of the integral body, and said neck having in a side thereof a recess to receive, in the plane of said strap-body, said deformable portion thereof.

VICTOR R. DESPARD.